(12) United States Patent
Ohashi

(10) Patent No.: US 8,676,263 B2
(45) Date of Patent: Mar. 18, 2014

(54) WIRELESS BASE STATION, WIRELESS APPARATUS, WIRELESS CONTROLLING APPARATUS, AND COMMUNICATION METHOD

(75) Inventor: Takashi Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 12/963,775

(22) Filed: Dec. 9, 2010

(65) Prior Publication Data

US 2011/0143813 A1 Jun. 16, 2011

(30) Foreign Application Priority Data

Dec. 16, 2009 (JP) ................................ 2009-285411

(51) Int. Cl.
*H04B 1/38* (2006.01)
*H04W 4/00* (2009.01)
*H04J 3/00* (2006.01)
*H04B 7/216* (2006.01)
*H04J 3/16* (2006.01)

(52) U.S. Cl.
USPC ........ 455/561; 455/422.1; 370/336; 370/342; 370/345; 370/466; 370/468

(58) Field of Classification Search
USPC ............... 455/561, 422.1; 370/336, 342, 345, 370/466, 468
See application file for complete search history.

(56) References Cited

U.S. PATENT DOCUMENTS

| 7,460,513 | B2 | 12/2008 | Osterling |
| 7,529,215 | B2 | 5/2009 | Osterling |
| 7,656,897 | B2 | 2/2010 | Liu |
| 2005/0107124 | A1 | 5/2005 | Osterling |
| 2006/0277309 | A1* | 12/2006 | Eaton ........................... 709/227 |
| 2008/0119232 | A1 | 5/2008 | Oh et al. |
| 2011/0032910 | A1* | 2/2011 | Aarflot et al. ................. 370/335 |
| 2012/0052878 | A1 | 3/2012 | Sakama |

FOREIGN PATENT DOCUMENTS

| JP | 2007-124608 A | 5/2007 |
| JP | 2007-511955 | 5/2007 |
| JP | 2008-131651 A | 6/2008 |
| WO | WO-2005/048624 A1 | 5/2005 |
| WO | WO-2010/137126 A1 | 12/2010 |

OTHER PUBLICATIONS

"CPRI Specification V4.1", Common Public Radio Interface (CPRI) Specification V4.1; Feb. 18, 2009.
"Japanese Office Action" mailed by JPO and corresponding to Japanese application No. 2009-285411 on Mar. 5, 2013, with English translation.

* cited by examiner

*Primary Examiner* — Christopher M Brandt
*Assistant Examiner* — Muthuswamy Manoharan
(74) *Attorney, Agent, or Firm* — Fujitsu Patent Center

(57) ABSTRACT

A wireless base station includes: a wireless apparatus; and a wireless controlling apparatus, the wireless controlling apparatus including: an embedding processor for embedding a control signal, which is to control a wireless device connected to the wireless apparatus, in a control and management information area in a specific frame, the specific frame being regularly assigned to each frame group including a predetermined number of frames of a plurality of frames included in a transmission frame transmitted via the transmission link; and a first transmitter for transmitting the transmission frame to the wireless apparatus via the transmission link, the wireless apparatus including: an extractor for extracting the control signal from the specific frame in the transmitted transmission frame; and a second transmitter for transmitting the extracted control signal to the wireless device.

7 Claims, 14 Drawing Sheets

| | Xs=0 | Xs=1 | Xs=2 | Xs=3 | |
|---|---|---|---|---|---|
| Ns=0 | 0 | 64 | 128 | 192 | } Comma byte/ Synchronization timing data |
| Ns=1 | 1 | 65 | 129 | 193 | } Slow control and management data |
| Ns=2 | 2 | 66 | 130 | 194 | } L1 inband protocol |
| Ns=3 | 3 | 67 | 131 | 195 | ⎫ |
| ⋮ | ⋮ | ⋮ | ⋮ | ⋮ | ⎬ Reserved |
| Ns=15 | 15 | 79 | 143 | 207 | ⎭ |
| Ns=16 | 16 | 80 | 144 | 208 | ⎫ |
| ⋮ | ⋮ | ⋮ | ⋮ | ⋮ | ⎬ Vender specific information |
| Ns=P−1 | P−1 | P+63 | P+127 | P+191 | ⎭ |
| Ns=P | P | P+64 | P+128 | P+192 | ⎫ |
| ⋮ | ⋮ | ⋮ | ⋮ | ⋮ | ⎬ Fast control and management data |
| Ns=63 | 63 | 127 | 191 | 255 | ⎭ |

FIG. 6 ly appears in US 8,676,263 B2

WIRELESS BASE STATION, WIRELESS APPARATUS, WIRELESS CONTROLLING APPARATUS, AND COMMUNICATION METHOD

CROSS-REFERENCE TO RELATED APPLICATIONS

This application is based upon and claims the benefit of priority of the prior Japanese Patent Application No. 2009-285411, file on Dec. 16, 2009, the entire contents of which are incorporated herein by reference.

FIELD

The present invention relates to: a wireless base station provided with a wireless apparatus for performing a wireless transmission and reception process and a wireless controlling apparatus for performing a baseband process or the like; the wireless apparatus and the wireless controlling apparatus included in such a wireless base station; and a communication method in such a wireless base station.

BACKGROUND

As the structure of a wireless base station in a wireless communication system such as a mobile phone, there is known such a structure that a wireless apparatus (RE: Radio Equipment), which includes a wireless transmission and reception device for processing a wireless signal, and a wireless controlling apparatus (REC: Radio Equipment Control), which performs a baseband process or the like, are separated. This allows the RE to be disposed at a position distant from the REC. As an interface connecting the RE and the REC, for example, there is a common public radio interface (CPRI). By using the CPRI as the interface, it is possible to separate the wireless base station into the RE and the REC and to open the interface between the RE and the REC. Thus, it is possible to provide each multivendor part in the wireless base station.

On the other hand, in the wireless base station, there is disposed an antenna line device (ALD) including an antenna, an amplifier, or the like. The operation of the ALD is controlled on the basis of an ALD control signal, which is transmitted to the ALD from an ALD controller disposed in the wireless base station. Here, in the wireless base station in which the RE and the REC are not separated, the ALD controller, which is built in the wireless base station or disposed near the wireless base station, is disposed near the ALD which is often disposed near the RE. However, as described above, in recent years, the RE can be disposed at the position distant from the REC. Therefore, the ALD controller, which is disposed at the position distant from the RE, may need to transmit the ALD control signal to the ALD, which is often disposed near the RE. In other words, the ALD controller may need to remotely operate (or remotely control) the ALD.

As a first method by which the ALD controller remotely operates (or remotely controls) the ALD, there is a method of disposing a dedicated line for transmitting the ALD control signal between the ALD controller and the ALD. Moreover, as a second method by which the ALD controller remotely operates (or remotely controls) the ALD, there is a method of encapsulating and embedding the ALD control signal in a CPRI link between the RE and the REC together with information indicating the transmission destination of the ALD control signal.

Patent document 1: Japanese National Publication of Internal Patent Application No. 2007-511955
Patent document 2: Japanese Laid Open Patent Publication No. 2007-124608
Patent document 3: Japanese Laid Open Patent Publication No. 2008-131651

SUMMARY

However, the first method may require newly installing the dedicated line. This increases costs associated with the installation of the dedicated line. Therefore, it is hardly said that the first method can be easily adopted. Moreover, the second method may require a special apparatus for encapsulating the ALD control signal. In particular, because the ALD control signal is encapsulated and embedded in the CPRI link (i.e. a CPRI frame transmitted in the CPRI link), the structure of the CPRI frame fails to meet its standard. Thus, it is hardly said that the second method has versatility.

According to an aspect of the embodiment, a wireless base station includes: a wireless apparatus; and a wireless controlling apparatus for controlling the wireless apparatus. The wireless apparatus and the wireless controlling apparatus are connected via a transmission link The wireless controlling apparatus is an apparatus for controlling the wireless apparatus. The wireless controlling apparatus may perform, for example, a baseband process or the like on a signal to be transmitted to the wireless apparatus, or a signal received from the wireless apparatus. The wireless controlling apparatus includes: an embedding processor; and a first transmitter. The embedding processor embeds a control signal, which is to control a wireless device connected to the wireless apparatus, in a control and management information area in a specific frame included in a transmission frame transmitted via the transmission link. The specific frame is a frame which is regularly (or periodically) assigned to each frame group including a predetermined number of frames of a plurality of frames included in the transmission frame. The first transmitter transmits the transmission frame in which the control signal is embedded, to the wireless apparatus via the transmission link.

The wireless apparatus is, for example, an apparatus disposed at a position (or a remote position) away from a position at which the wireless controlling apparatus is disposed. The wireless apparatus is an apparatus for performing at least one of a wireless transmission process and a wireless reception process on a signal transmitted from the wireless controlling apparatus or a signal received via the wireless device, such as an antenna. The wireless apparatus includes: an extractor; and a second transmitter. The extractor extracts the control signal for controlling the wireless device, from the specific frame in the transmission frame transmitted from the wireless controlling apparatus. The second transmitter transmits the control signal extracted by the extractor, to the wireless device.

According to another aspect of the embodiment, a communication method includes: an embedding process; a first transmitting process; an extracting process; and a second transmitting process. In the embedding process, the same operation as that performed by the aforementioned embedding processor is performed. In the first transmitting process, the same operation as that performed by the aforementioned first transmitter is performed. In the extracting process, the same operation as that performed by the aforementioned extractor is performed. In the second transmitting process, the same operation as that performed by the aforementioned second transmitter is performed. The embedding process and the first transmitting process may be performed on the wireless controlling apparatus side. The extracting process and the second transmitting process may be performed on the wireless apparatus side.

According to another aspect of the embodiment, a wireless controlling device includes: the aforementioned embedding processor; and the aforementioned first transmitter. According to another aspect of the embodiment, a wireless apparatus includes: the aforementioned extractor; and the aforementioned second transmitter.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 6 is a data structure view illustrating the data structure of a control word;

DESCRIPTION OF EMBODIMENT

Hereinafter, the best mode for carrying out the present invention will be explained with reference to the drawings.

(1) First Embodiment

With reference to FIG. 1 to FIG. 10, a wireless base station 1 in a first embodiment will be explained.

(1-1) Structure View

Figure 1:
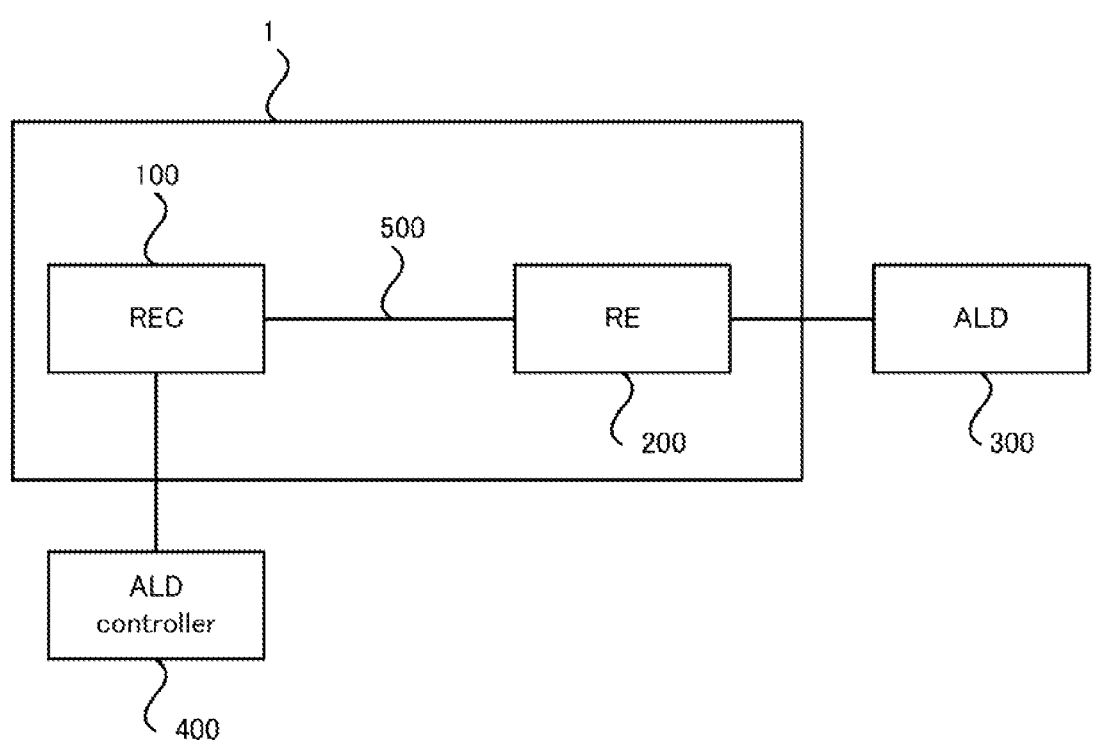
FIG. 1 is a block diagram illustrating one example of the structure of a wireless base station in a first embodiment.

With reference to FIG. 1, the structure of the wireless base station 1 in the first embodiment will be explained. FIG. 1 is a block diagram illustrating one example of the structure of the wireless base station 1 in the first embodiment.

As illustrated in FIG. 1, the wireless base station 1 in the first embodiment includes a radio equipment control (REC) 100 and a radio equipment (RE) 200. The wireless base station 1 in the first embodiment has such a structure that one RE 200 is connected to one REC 100 via a common public radio interface (CPRI) link 500 including a communication line (e.g. optical fiber or the like) whose transmission distance may be several tens meters to several tens kilometers. An antenna line device (ALD) 300 is connected to the wireless base station 1 (particularly, the RE 200) in the first embodiment via a wired or wireless communication line. An ALD controller 400 is connected to the wireless base station 1 (particularly, the REC 100) in the first embodiment via a wired or wireless communication line.

The REC 100 is an apparatus for performing a baseband process or the like. Specifically, the REC 100 performs the baseband process, coding process, modulation process, and the like on data which is to be transmitted to a not-illustrated mobile terminal via the RE 200 and the ALD 300. The data on which the baseband process, coding process, modulation process, and the like are performed is transmitted to the RE 200 via the CPRI link 500 such as an optical fiber. Moreover, the REC 100 performs the baseband process, coding process, modulation process, and the like on data which is received from the not-illustrated mobile terminal via the RE 200 and the ALD 300.

The RE 200 is an apparatus for performing at least one of a wireless transmission process and a wireless reception process or the like. The RE 200 is disposed at a position distant from the REC 100. Specifically, the RE 200 performs the wireless transmission process or the like, such as an amplification process, on the data which is to be transmitted to the not-illustrated mobile terminal via the ALD 300 and on which the baseband process or the like is performed by the REC 100. Moreover, the RE 200 also performs the wireless reception process or the like on the data which is received from the not-illustrated mobile terminal via the ALD 300. The data on which the wireless reception process or the like is performed is transmitted to the REC 100 via the CPRI link 500.

The ALD 300 is a wireless device or antenna line device, such as an antenna (e.g. a remote tilt antenna) and an amplifier (e.g. a tower-mounted amplifier). The ALD 300 is disposed, for example, close to the RE 200. In other words, the ALD 300 is disposed at the position distant from the REC 100. The ALD 300 transmits the data, which is transmitted from the RE 200 (i.e. a wireless signal), to the not-illustrated mobile terminal as a wireless electric wave. The ALD 300 receives the wireless electric wave which is transmitted from the not-illustrated mobile terminal and transmits the received signal to the RE 200 as the data. Incidentally, FIG. 1 illustrates the structure that the ALD 300 is disposed outside the wireless base station 1; however, the ALD 300 may be disposed within the wireless base station 1.

The ALD controller 400 transmits and receives an ALD control signal for controlling the ALD 300, to and from the ALD 300. The ALD controller 400 is disposed, for example, at a position distant from the RE 200 and the ALD 300. In the first embodiment, as detailed later, the ALD control signal is transmitted and received via the REC 100 by using a CPRI frame, which is transmitted and received between the REC 100 and the RE 200. Because the detailed aspect of the transmission and the reception of the ALD control signal will be detailed later, the detailed explanation here will be omitted. Incidentally, FIG. 1 illustrates the structure that the ALD controller 400 is disposed outside the wireless base station 1; however, the ALD controller 400 may be disposed within the wireless base station 1.

According to the wireless base station 1, for example, by installing the RE 200 in an underground mall or the like, the mobile terminal can be used even where an electric wave is not sufficiently reached from a point at which the REC 100 is disposed (e.g. at the street level).

(1-2) Detailed Structure View

An explanation will be given on the detailed structure of each of the REC 100 and the RE 200 included in the wireless base station 1 in the first embodiment.

(1-2-1) Structure of REC

Figure 2:
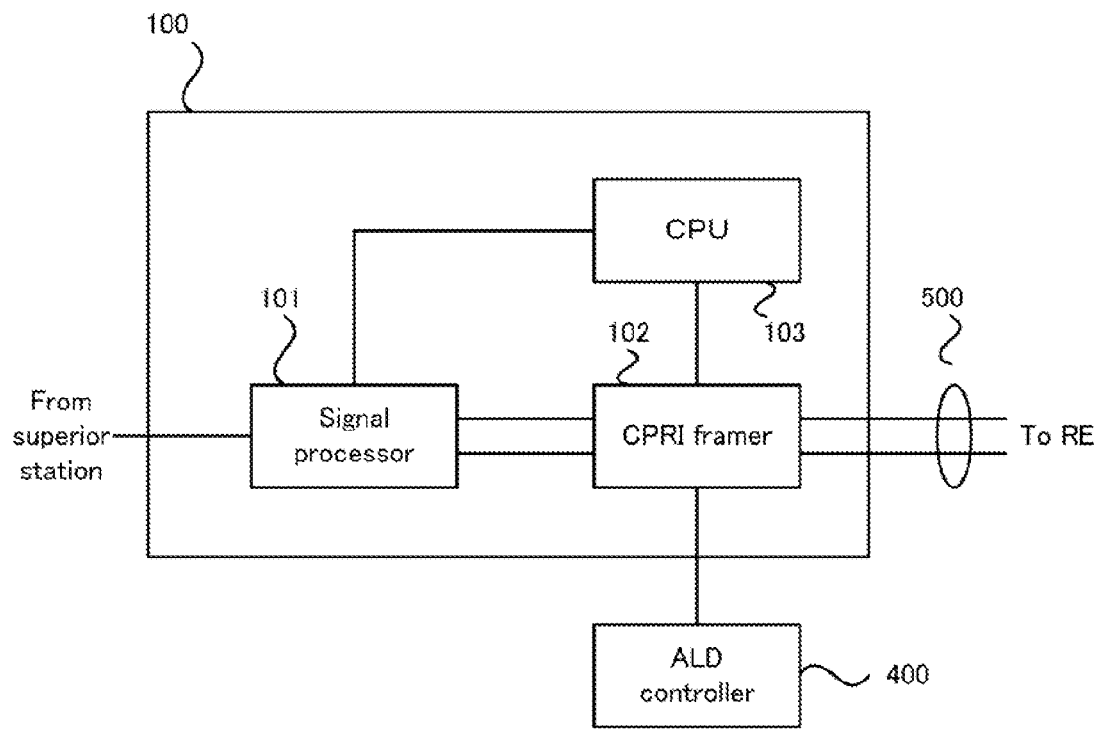
FIG. 2 is a block diagram illustrating one example of the structure of a REC included in the wireless base station in the first embodiment.

With reference to FIG. 2, the structure of the REC 100 included in the wireless base station 1 in the first embodiment will be described. FIG. 2 is a block diagram illustrating one example of the structure of the REC 100 included in the wireless base station 1 in the first embodiment. Incidentally, hereinafter, the structure peculiar to the REC 100 in the first embodiment will be selectively explained; however, it is obvious that another structure necessary for the operations of the REC 100 may be provided, as occasion demands.

As illustrated in FIG. 2, the REC 100 includes a signal processor 101, a CPRI framer 102, and a CPU 103.

The signal processor 101 performs the baseband process or the like on data which is transmitted from a not-illustrated superior station (e.g. RNC or the like) which is connected to the REC 100 via a wired or wireless communication line. The data on which the baseband process or the like is performed is transmitted to the CPRI framer 102. Moreover, the signal processor 101 performs the baseband process or the like on data which is transmitted from the CPRI framer 102. The data on which the baseband process or the like is performed is transmitted to the superior station.

The CPRI framer 102 converts the data, on which the baseband process or the like is performed, to the CPRI frame described later. The converted data (i.e. the CPRI frame) is transmitted to the RE 200 via the CPRI link 500. Moreover, the CPRI framer 102 converts the CPRI frame, which is transmitted from the RE 200 via the CPRI link 500, to the data that can be processed within the REC 100. The converted data is transmitted to the signal processor 101.

The CPRI framer 102 embeds (in other words, performs mapping) the ALD control signal, which is transmitted from the ALD controller 400, in the CPRI frame. The CPRI frame in which the ALD control signal is embedded is transmitted to the RE 200 via the CPRI link 500. In the same manner, the CPRI framer 102 extracts the ALD control signal embedded in the CPRI frame transmitted from the RE 200. The extracted ALD control signal is transmitted to the ALD controller 400.

The CPU 103 controls the entire operation of the REC 100. The CPU 103 operates on the basis of a predetermined firmware, thereby controlling the entire operation of the REC 100 (e.g. the operations of the signal processor 101 and the CPRI framer 102).

(1-2-2) Structure of RE

Figure 3:
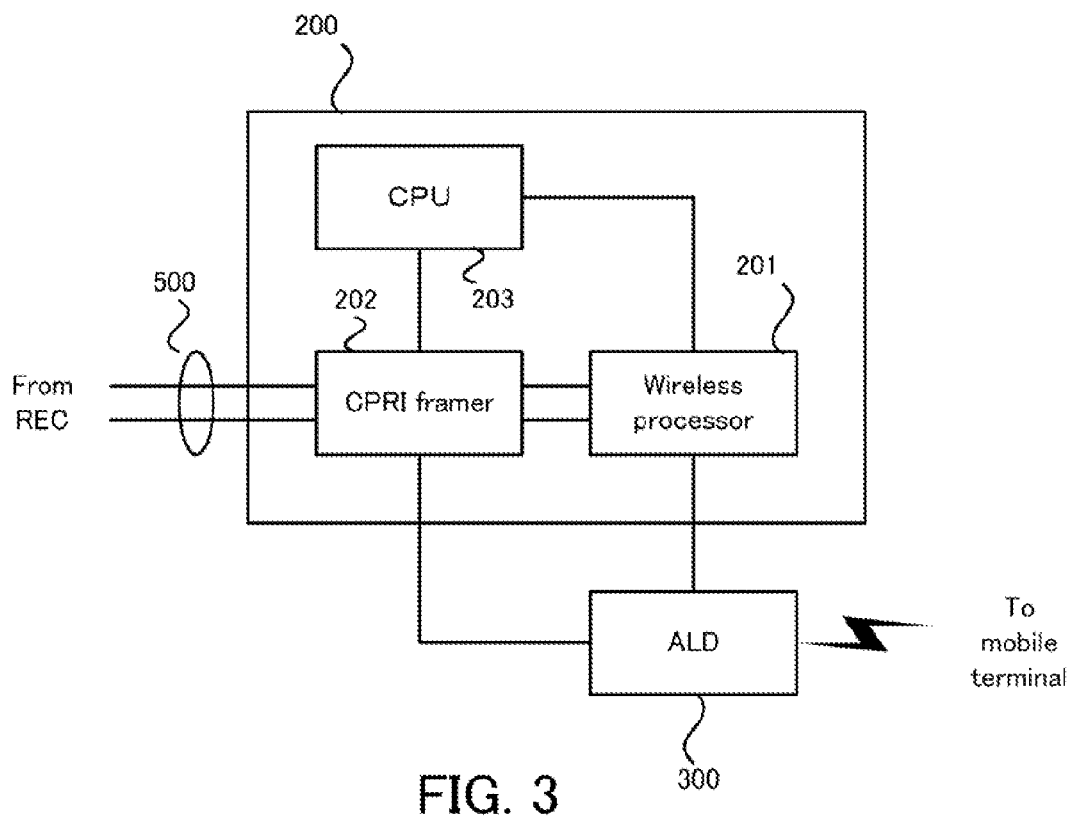
FIG. 3 is a block diagram illustrating one example of the structure of a RE included in the wireless base station in the first embodiment.

With reference to FIG. 3, the structure of the RE 200 included in the wireless base station 1 in the first embodiment will be described. FIG. 3 is a block diagram illustrating one example of the structure of the RE 200 included in the wireless base station 1 in the first embodiment. Incidentally, hereinafter, the structure peculiar to the RE 200 in the first embodiment will be selectively explained; however, it is obvious that another structure necessary for the operations of the RE 200 may be provided, as occasion demands.

As illustrated in FIG. 3, the RE 200 includes a wireless processor 201, a CPRI framer 202, and a CPU 203.

The wireless processor 201 performs the wireless reception process or the like on data which is transmitted from a not-illustrated mobile terminal. The data on which the wireless reception process or the like is performed is transmitted to the CPRI framer 202. Moreover, the wireless processor 201 performs the wireless transmission process or the like on data which is transmitted from the CPRI framer 202. The data on which the wireless transmission process or the like is performed is transmitted to the not-illustrated mobile terminal via the ALD 300.

The CPRI framer 202 converts the data, on which the wireless reception process or the like is performed, to the CPRI frame. The converted data (i.e. the CPRI frame) is transmitted to the REC 100 via the CPRI link 500. Moreover, the CPRI framer 202 converts the CPRI frame, which is transmitted from the REC 100 via the CPRI link 500, to the data that can be processed within the RE 200. The converted data is transmitted to the wireless processor 201.

The CPRI framer 202 extracts the ALD control signal embedded in the CPRI frame, which is transmitted from the REC 100. The extracted ALD control signal is transmitted to the ALD 300. Moreover, the CPRI framer 202 embeds the ALD control signal, which is transmitted from the ALD 300, in the CPRI frame. The CPRI frame in which the ALD control signal is embedded is transmitted to the REC 100 via the CPRI link 500.

The CPU 203 controls the entire operation of the RE 200. The CPU 203 operates on the basis of a predetermined firmware, thereby controlling the entire operation of the RE 200 (e.g. the operations of the signal processor 201 and the CPRI framer 202).

(1-3) CPRI Protocol

Figure 4:
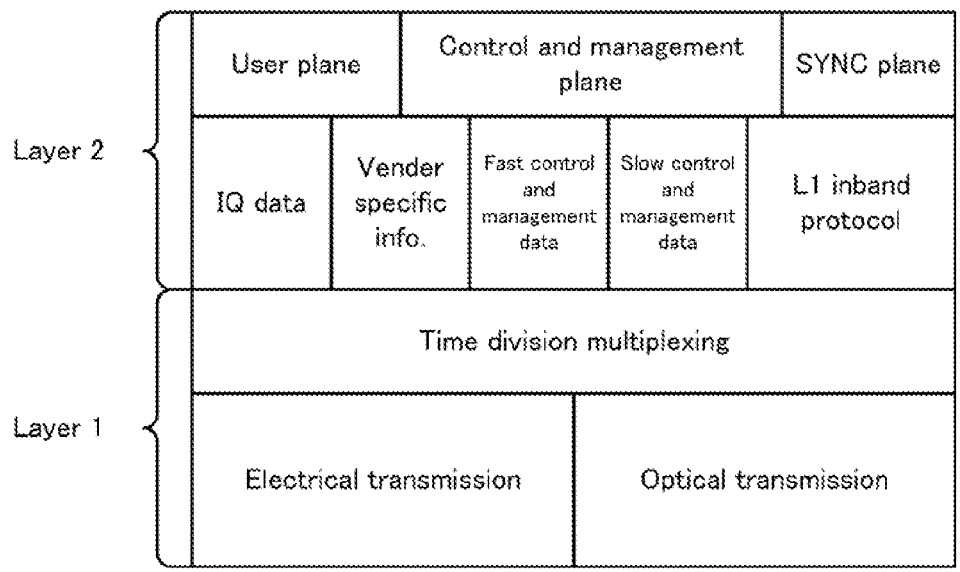
FIG. 4 is an explanatory diagram illustrating the hierarchy structure of a CPRI protocol.

With reference to FIG. 4, an explanation will be given on a CPRI protocol with which the CPRI link 500 for connecting the REC 100 and the RE 200 complies. FIG. 4 is an explanatory diagram illustrating the hierarchy structure of the CPRI protocol.

As illustrated in FIG. 4, the CPRI protocol defines a physical layer (first layer: Layer 1) and a data link layer (second layer: Layer 2). The Layer 1 defines, for example, electric characteristics, optical characteristics, time-division multiplexing of different data flows, low-level signaling, and the like. The Layer 2 defines the media and access control of a control and management information flow, flow control, and data protection.

In the Layer 2, a user plane, a control and management plane, and synchronization (SYNC) plane are defined. The user plane is a protocol data plane associated with the data transmission from the REC 100 to the RE 200 and the data transmission from the RE 200 to the REC 100. The user plane includes: an IQ data area for storing the data transmitted from the REC 100 to the RE 200 or from the RE 200 to the REC 100 as IQ data in a format of complex data; and a vender specific information area for storing vender specific information which is specific to a vender. The control and management plane is a protocol data plane associated with the transmission and the reception of (i) control data for call processing and (ii) management data for employment, management and maintenance of the REC 100 and the RE 200. The control and management plane includes: a fast control and management data area for storing fast control and management data (Fast C&M) which complies with the Ethernet (registered trademark) protocol; a slow control and management data area for storing a slow control and management data (Slow C&M) which complies with a high level data link control (HDLC)

protocol; and a Layer 1 inband protocol area for storing a Layer 1 inband protocol. The SYNC plane is a protocol data plane associated with the transmission and the reception of synchronization timing data between the REC 100 and the RE 200. The SYNC plane includes the Layer 1 inband protocol area for storing the L1 inband protocol as the synchronization timing data. Those data are multiplexed on an electrical transmission line or an optical transmission line in a time-division multiplexing mode, which is defined in the Layer 1.

Figure 5:
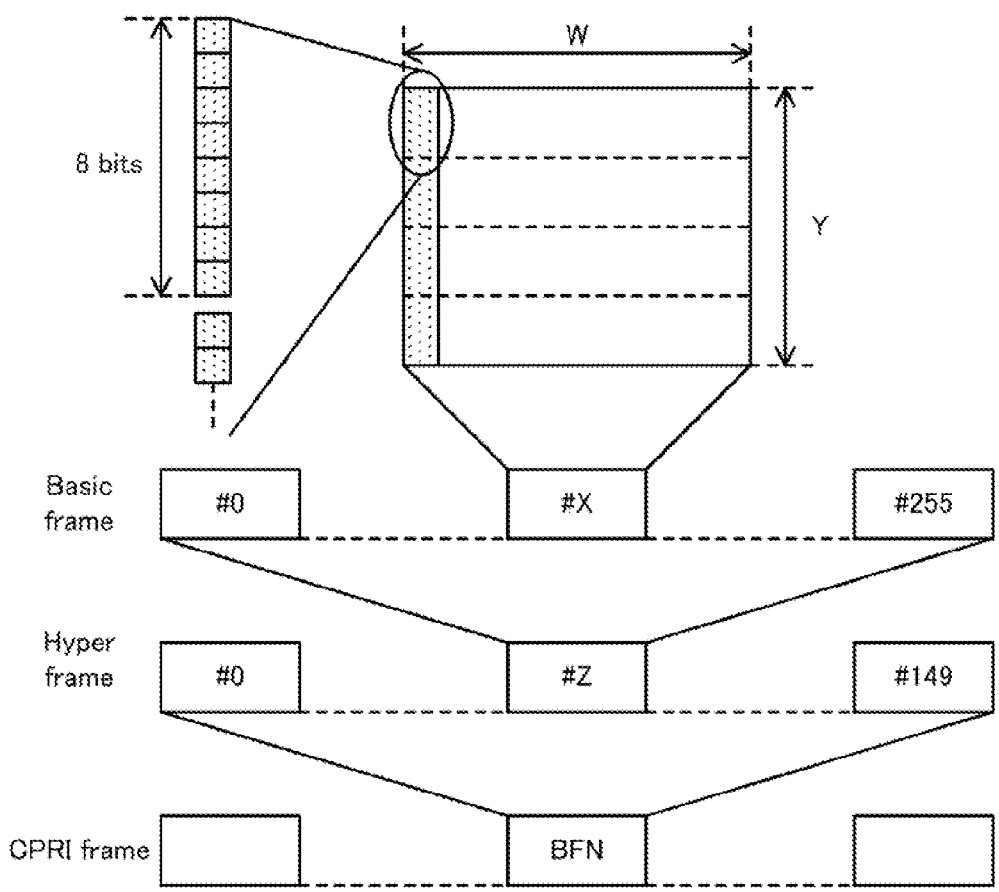
FIG. 5 is a data structure view illustrating the structure of a CPRI frame which complies with the CPRI protocol.

Next, with reference to FIG. 5, the CPRI frame which complies with the CPRI protocol will be explained. FIG. 5 is a data structure view illustrating the structure of the CPRI frame which complies with the CPRI protocol.

As illustrated in FIG. 5, one CPRI frame (universal mobile telecommunications system (UMTS) physical frame) with a length of 10 milliseconds (ms) includes 150 hyperframes. One hyperframe includes 256 basic frames. One basic frame can store therein data with a size of 8-bit×16-word (or at most data with a size of 8-bit×16-word×4). In the CPRI, in normal notation, $Z$ ($Z=0, \ldots, 149$) is used to represent the hyperframe number of a corresponding hyperframe in the CPRI frame with a length of 10 ms; $X$ ($X=0, \ldots, 255$) is used to represent the frame number of a corresponding basic frame in the hyperframe; $W$ ($W=0, \ldots, 15$) is used to represent a corresponding word number in one basic frame; $Y$ ($Y=0, \ldots, 3$) is used to represent one corresponding byte number in one word which is composed of one basic frame; and $B$ ($B=0, \ldots, 31$) is used to represent one corresponding bit number in one word which is composed of one basic frame.

The first word in each basic frame (i.e. the word specified by $W=0$) is used as a control word for storing data other than the IQ data included in the user plane described above. Now, with reference to FIG. 6, the data structure of the control word will be explained. FIG. 6 is a data structure view illustrating the data structure of the control word.

FIG. 6 illustrates the arrangement of the first words of 256 basic frames (i.e. control words) included in one hyperframe. The area specified by "#X" in FIG. 6 indicates the control word of the basic frame with a basic frame number of X. As illustrated in FIG. 6, in the control word of the basic frame with $X=0$ (i.e. Z.0.Y), a comma byte is stored. In each of the control words of the basic frames with $X=64$, 128 and 192 (i.e. Z.64.Y, Z.128.Y, and Z.192.Y), the synchronization timing data is stored. In each of the control words of the basic frames with $X=1$, 65, 129 and 193 (i.e. Z.1.Y, Z.65.Y, Z.129.Y, and Z.193.Y), the slow control and management data is stored. In each of the control words of the basic frames with $X=2$, 66, 130 and 194 (i.e. Z.2.Y, Z.66.Y, Z.130.Y, and Z.194.Y), the L1 inband protocol is stored. Each of the control words of the basic frames with $X=3$ to 15, 67 to 79, 131 to 143 and 195 to 207 (i.e. Z.3.Y to Z.15.Y, Z.67.Y to Z.79.Y, Z.131.Y to Z.143.Y, and Z.195.Y to Z.207.Y), the L1 inband protocol is reserved as a reserved area. In each of the control words of the basic frames with $X=16$ to P−1 (wherein P is a variable specified by a pointer for the fast control and management data), 80 to P+63, 144 to P+127 and 208 to P+191 (i.e. Z.16.Y to Z.P−1.Y, Z.80.Y to Z.P+63.Y, Z.144.Y to Z.P+127.Y, and Z.208.Y to Z.P+191.Y), the vender specific information is stored. In each of the control words of the basic frames with X=P to 63, P+64 to 127, P+128 to 191 and P+192 to 255 (i.e. Z.P.Y to Z.63.Y, Z.P+64.Y to Z.127.Y, Z.P+128.Y to Z.191.Y, and Z.P+192.Y to Z.255.Y), the fast control and management data is stored.

(1-4) Explanation of Operation

The operation of the wireless base station 1 (i.e. the operations of the REC 100 and the RE 200) will be explained.

(1-4-1) Operation of REC

Figure 7:
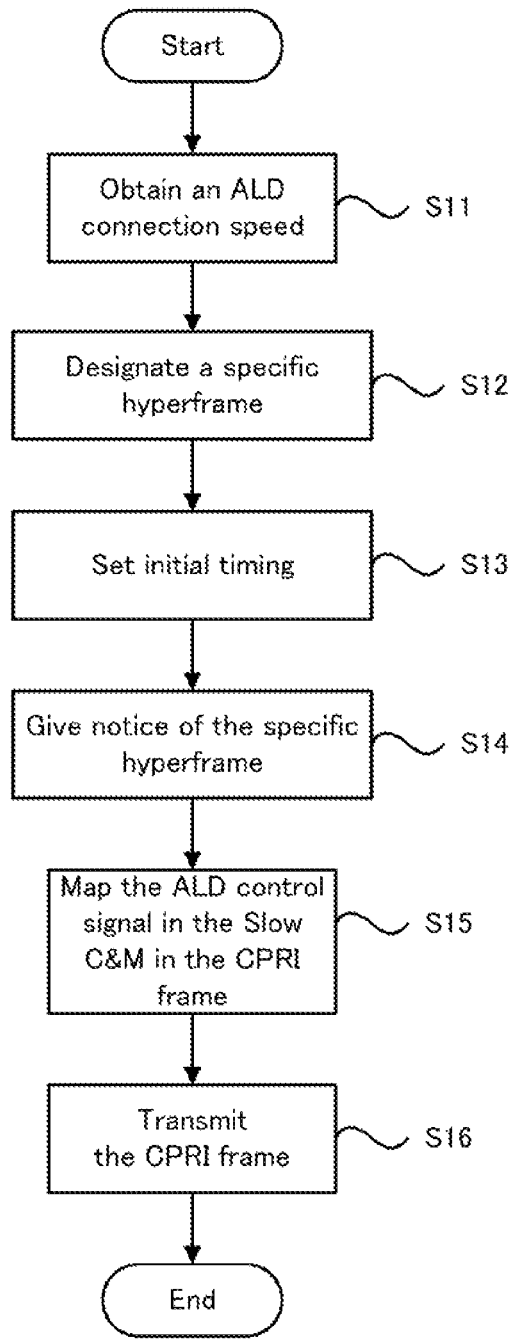
FIG. 7 is a flowchart illustrating a flow of operations of the REC included in the wireless base station in the first embodiment.

With reference to FIG. 7, the operation of the REC 100 included in the wireless base station 1 in the first embodiment will be explained. FIG. 7 is a flowchart illustrating a flow of operation of the REC 100 included in the wireless base station 1 in the first embodiment.

As illustrated in FIG. 7, the CPU 103 included in the REC 100 obtains an ALD connection speed for transmitting the ALD control signal to the RE 200 (step S11). For example, the CPU 103 may obtain the ALD connection speed by querying the ALD 300. Alternatively, the CPU 103 may also obtain the ALD connection speed set in advance.

Then, the CPU 103 included in the REC 100 designates a specific hyperframe into which the ALD control signal is embedded, in order to satisfy the ALD connection speed obtained in the step S11 (step S12). More specifically, the CPU 103 generates divisional frame groups (in other words, conversion frames) into which 150 hyperframes are divided by the predetermined number of frames. Then, the CPU 103 designates the hyperframe which regularly or periodically appears in each conversion frame, as a specific hyperframe.

The CPU 103 included in the REC 100 may designate the basic frame into which the ALD control signal is embedded, in the specific hyperframe. More specifically, in the first embodiment, the ALD control signal is embedded in the "slow control and management data area" in the CPRI frame. The slow control and management data area corresponds to the control words of the basic frames with $X=1$, 65, 129 and 193. Therefore, the CPU 103 may designate at least one of the four basic frames with $X=1$, 65, 129 and 193, as the basic frame into which the ALD control signal is embedded. In this case, the ALD control signal may be embedded in at least one control word (i.e. the slow control and management data area) of the four basic frames with $X=1$, 65, 129 and 193 in the specific hyperframe.

Figure 8:
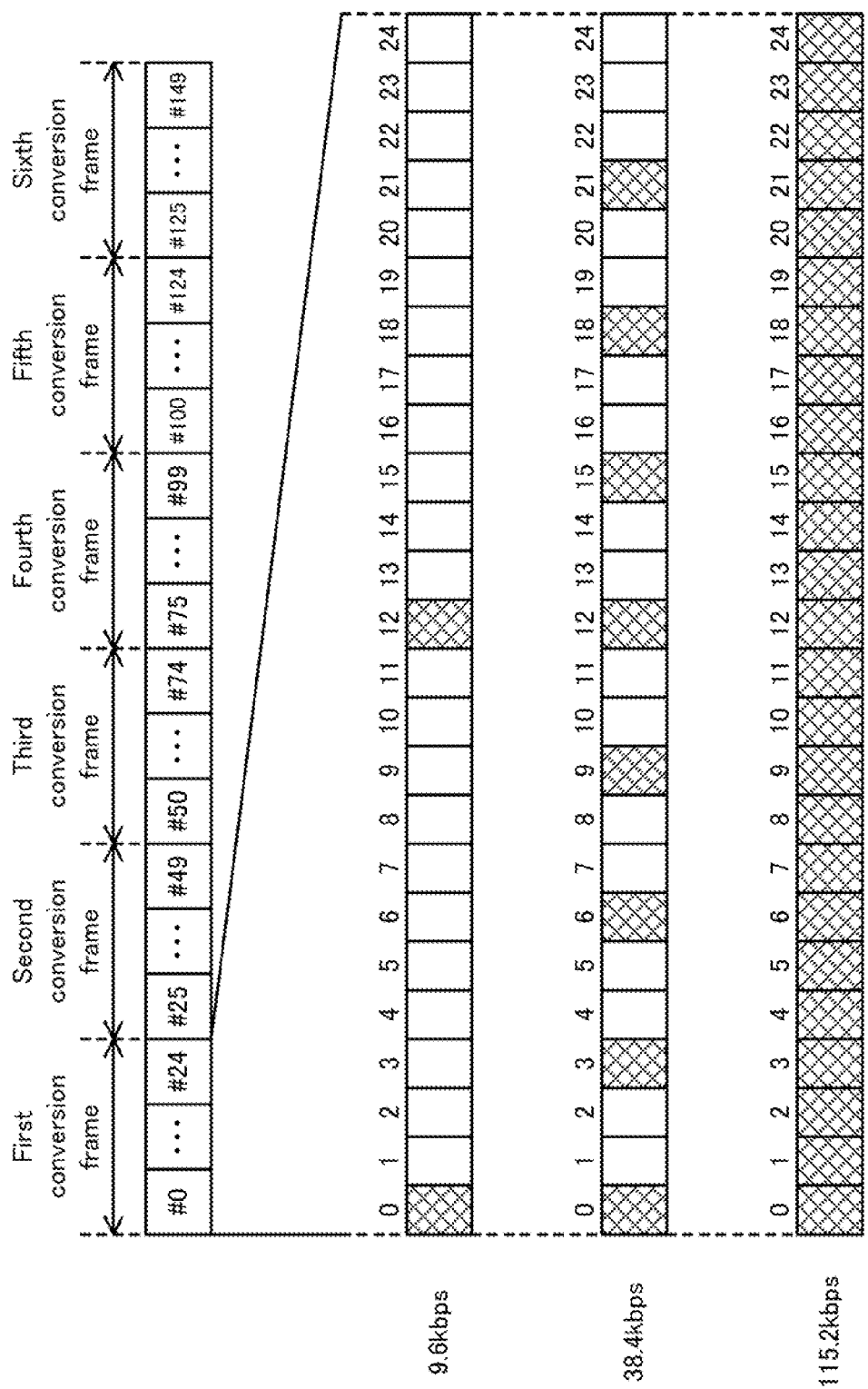
FIG. 8 is a data structure view illustrating an aspect of designating a specific hyperframe into which an ALD control signal is embedded.

Now, with reference to FIG. 8, an explanation will be given on an aspect of designating the specific hyperframe into which the ALD control signal is embedded. FIG. 8 is a data structure view illustrating the aspect of designating the specific hyperframe into which the ALD control signal is embedded.

As illustrated in FIG. 8, an explanation will be given on an example in which the CPU 103 divides 150 hyperframes by 25 hyperframes, thereby generating the conversion frames. In this case, 150 hyperframes are divided into a first conversion frame including 25 hyperframes with $Z=0$ to 24, a second conversion frame including 25 hyperframes with $Z=25$ to 49, a third conversion frame including 25 hyperframes with $Z=50$ to 74, a fourth conversion frame including 25 hyperframes with $Z=75$ to 99, a fifth conversion frame including 25 hyperframes with $Z=100$ to 124, and a sixth conversion frame including 25 hyperframes with $Z=125$ to 149.

Moreover, the following explanation is related to an example in which the embedding is performed in the control word of one basic frame of the four basic frames with $X=1$, 65, 129 and 193 in the specific hyperframe.

If the ALD connection speed obtained in the step S11 in FIG. 7 is "9.6 kbps", for example, the CPU 103 may designate two hyperframes in each conversion frame, as the specific hyperframes. At this time, the CPU 103 preferably designates the specific hyperframes such that the designated specific hyperframe appears regularly or periodically. For example, in the example illustrated in FIG. 8, the CPU 103 may designate the ($12 \times p+1$)-th hyperframes (i.e. two hyperframes) from each conversion frame, as the specific hyperframes (wherein $p=0, 1$). In other words, the CPU 103 may designate two hyperframes with $Z=12p$ (i.e. 0 and 12) from the first conversion frame, as the specific hyperframes. In the same manner, the CPU 103 may designate two hyperframes with $Z=12p+25$ (i.e. 25 and 37) from the second conversion frame, as the specific hyperframes. In the same manner, the CPU 103 may designate two hyperframes with $Z=12p+50$ (i.e. 50 and 62) from the third conversion frame, as the specific hyperframes. In the same manner, the CPU 103 may designate two hyperframes with $Z=12p+75$ (i.e. 75 and 87) from the fourth conversion frame, as the specific hyperframes. In the same manner, the CPU 103 may designate two hyperframes with $Z=12p+100$ (i.e. 100 and 112) from the fifth conversion frame, as the specific hyperframes. In the same manner, the CPU 103 may designate two hyperframes with $Z=12p+125$ (i.e. 125 and 137) from the sixth conversion frame, as the specific hyperframes. The designation of the specific hyperframes as described above allows the transmission of the ALD control signal by using the control word of one basic frame included in each of the 2×6 specific hyperframes, for 10 milliseconds (i.e. during the transmission of one CPRI frame). Therefore, it is possible to realize a connection speed (in other words, a transmission rate) of $2\times6\times8$ (bits)$/10\times10^{-3}$ (seconds)=9.6 kbps.

Alternatively, if the ALD connection speed obtained in the step S11 in FIG. 7 is "38.4 kbps", for example, the CPU 103 may designate eight hyperframes in each conversion frame as the specific hyperframes. Even at this time, the CPU 103 preferably designates the specific hyperframes such that the designated specific hyperframe appears regularly or periodically. For example, in the example illustrated in FIG. 8, the CPU 103 may designate the (3q+1)-th hyperframe (i.e. eight hyperframes) from each conversation frame, as the specific hyperframe (wherein q=0, 1, 2, 3, 4, 5, 6, 7). In other words, the CPU 103 may designate eight hyperframes with $Z=3q$ (i.e. 0, 3, 6, 9, 12, 15, 18 and 21) from the first conversion frame, as the specific hyperframes. In the same manner, the CPU 103 may designate eight hyperframes with $Z=3q+25$ (i.e. 25, 28, 31, 34, 37, 40, 43 and 46) from the second conversion frame, as the specific hyperframes. In the same manner, the CPU 103 may designate eight hyperframes with $Z=3q+50$ (i.e. 50, 53, 56, 59, 62, 65, 68 and 71) from the third conversion frame, as the specific hyperframes. In the same manner, the CPU 103 may designate eight hyperframes with $Z=3q+75$ (i.e. 75, 78, 81, 84, 87, 90, 93 and 96) from the fourth conversion frame, as the specific hyperframes. In the same manner, the CPU 103 may designate eight hyperframes with $Z=3q+100$ (i.e. 100, 103, 106, 109, 112, 115, 118 and 121) from the fifth conversion frame, as the specific hyperframes. In the same manner, the CPU 103 may designate eight hyperframes with $Z=3q+125$ (i.e. 125, 128, 131, 134, 137, 140, 143 and 146) from the sixth conversion frame, as the specific hyperframes. The designation of the specific hyperframes as described above allows the transmission of the ALD control signal by using the control word of one basic frame included in each of the 8×6 specific hyperframes, for 10 milliseconds (i.e. during the transmission of one CPRI frame). Therefore, it is possible to realize a connection speed of $8\times6\times8$ (bits)$/10\times10^{-3}$ (seconds)=38.4 kbps.

Alternatively, if the ALD connection speed obtained in the step S11 in FIG. 7 is "115.2 kbps", for example, the CPU 103 may designate all the hyperframes in each conversion frame as the specific hyperframes. The designation of the specific hyperframes as described above allows the transmission of the ALD control signal by using the control word of one basic frame included in each of the 25×6 specific hyperframes, for 10 milliseconds (i.e. during the transmission of one CPRI frame). Therefore, it is possible to realize a connection speed of $25\times6\times8$ (bits)$/10\times10^{-3}$ (seconds)=120 kbps (>115.2 kbps).

The aforementioned connection speed may be adjusted by the number of the basic frames in which the ALD control signal is embedded (in other words, the number of the control words, which are the slow control and management data area). For example, in comparison with the connection speed in a case where the ALD control signal is embedded in the control word of one of the four basic frames with X=1, 65, 129 and 193, the connection speed in a case where the ALD control signal is embedded in the control words of r (wherein r=2, 3, 4) basic frames of the four basic frames with X=1, 65, 129 and 193 is r times greater. However, in accordance with the line bit rate of the CPRI, there are restrictions on the number of the control words, which are the slow control and management data area. Therefore, it is preferable to designate which of the four basic frames with X=1, 65, 129 and 193 is used in view of the line bit rate of the CPRI.

Incidentally, the example illustrated in FIG. 8 is one example. The operations in the first embodiment are not limited to the example illustrated in FIG. 8. Therefore, the CPU 103 may generate the conversion frames by dividing 150 hyperframes by an arbitrary number of hyperframes. In the same manner, the CPU 103 may designate an arbitrary hyperframe that appears regularly or periodically in each conversion frame, as the specific hyperframe. In the same manner, the CPU 103 may embed the ALD control signal in the control word of an arbitrary basic frame of the four basic frames with X=1, 65, 129 and 193.

In FIG. 7 again, the CPU 103 included in the REC 100 sets initial timing at which the ALD control signal is embedded in the CPRI frame (step S13). In other words, the CPU 103 sets timing to start to embed the ALD control signal in the CPRI frame.

Then, the CPU 103 included in the REC 100 notifies the RE 200 of specific information for specifying the specific hyperframe, via the CPRI framer 102 and the CPRI link 500 (step S14). The specific information may include the hyperframe number of the specific hyperframe. This allows the RE 200 to relatively easily specify the specific hyperframe. Alternatively, considering that the specific hyperframe appears regularly or periodically, the specific information may include at least one of the initial timing, cycles at which the specific hyperframe appears, and the size of the conversion frame. This allows the RE 200 to specify the specific hyperframe while reducing the size of the specific information. In any cases, as long as the information can properly specify the specific hyperframe, it can be used as the specific information.

The specific information may further include information for specifying the basic frame(s) in which the ALD control signal is embedded (in other words, the control word(s) in which the ALD control signal is embedded) in the specific hyperframe. For example, the specific information may include the basic frame number(s) of the basic frame(s) in which the ALD control signal is embedded. Alternatively, considering that the control word is specified by a control word number Xs (refer to FIG. 6) and a row number Ns and that the row number(s) Ns of the control word(s) in which the ALD control signal is embedded (i.e. the control word(s) which is the slow control and management data area) is all 1, the specific information may also include the control word number Xs. In any cases, as long as the information can properly specify the basic frame(s) in which the ALD control signal is embedded in the specific hyperframe, it can be used as the specific information.

Then, the CPRI framer 102 included in the REC 100 generates the CPRI frame while embedding the ALD control signal transmitted from the ALD controller 400, under the control of the CPU 103 (step S15). In other words, the CPRI framer 102 generates the CPRI frame while mapping the ALD control signal in the control word (i.e. the slow control and management data area) of at least one of the four basic frames with X=1, 65, 129 and 193 in the specific hyperframe specified in the step S14. Incidentally, each of the ALD control signal and the slow control and management data area complies with an HDLC protocol, and thus the CPRI framer 102 embeds the ALD control signal in the CPRI frame by performing simple mapping by a bit unit.

Then, the CPRI framer 102 included in the REC 100 transmits the CPRI frame to the RE 200 via the CPRI link 500 (step S16).

Incidentally, the ALD control signal may be transmitted not only from the ALD controller 400 to the ALD 300 but also from the ALD 300 to the ALD controller 400. Therefore, the REC 100 preferably extracts the ALD control signal embedded in the CPRI frame, in addition to or instead of embedding the ALD control signal in the CPRI frame. The operation of extracting the ALD control signal on the REC 100 is performed by the CPRI framer 102 which operates under the control of the CPU 103, in the same aspect as that of an operation of extracting the ALD control signal on the RE 200 described later.

(1-4-2) Operation of RE

Figure 9:
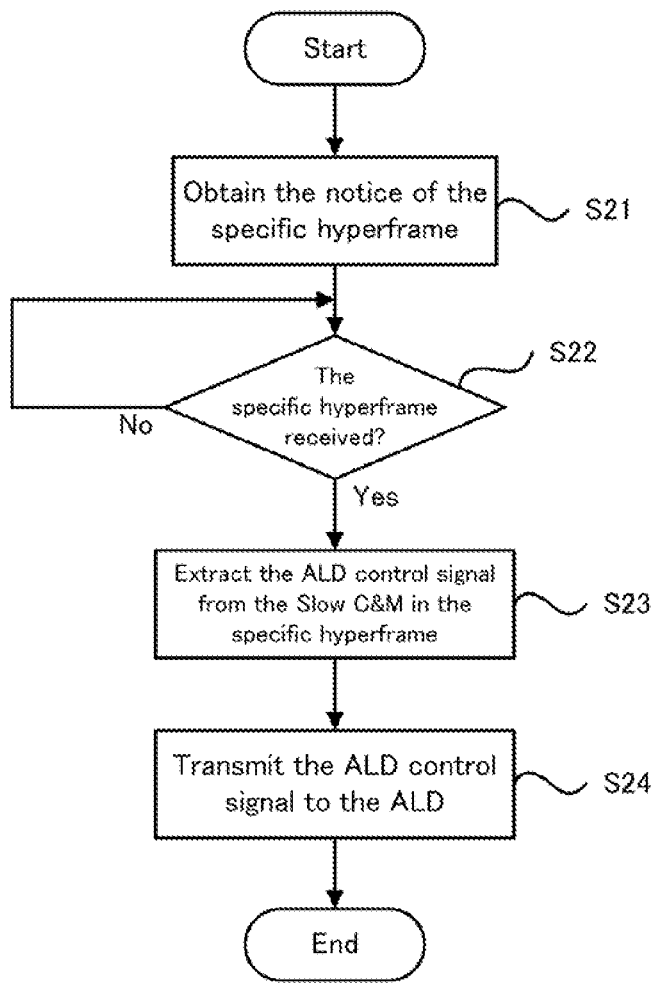
FIG. 9 is a flowchart illustrating a flow of operations of the RE included in the wireless base station in the first embodiment.

With reference to FIG. 9, the operation of the RE 200 included in the wireless base station 1 in the first embodiment will be explained. Here, an explanation will be given on the operation in which the RE 200 extracts the ALD control signal embedded in the CPRI frame. FIG. 9 is a flowchart illustrating a flow of operation of the RE 200 included in the wireless base station 1 in the first embodiment.

As illustrated in FIG. 9, the CPU 203 included in the RE 200 obtains the specific information transmitted from the REC 100 via the CPRI framer 202 and the CPRI link 500 (step S21).

Then, the CPRI framer 202 included in the RE 200 judges whether or not the specific hyperframe is received, on the basis of the specific information obtained in the step S21, under the control of the CPU 203 (step S22).

As a result of the judgment in the step S22, if it is judged that the specific hyperframe is not received (the step S22: No), the judgment operation in the step S22 is continued.

On the other hand, as a result of the judgment in the step S22, if it is judged that the specific hyperframe is received (the step S22: Yes), the CPRI framer 202 included in the RE 200 extracts the ALD control signal from the slow control and management data area in the specific hyperframe (step S23).

Then, the CPRI framer 202 included in the RE 200 transmits the ALD control signal extracted in the step S23 to the ALD 300 (step S24). As a result, the ALD 300 operates under the control by the ALD control signal.

Incidentally, the ALD control signal may be transmitted not only from the ALD controller 400 to the ALD 300, but also from the ALD 300 to the ALD controller 400 in some cases. Therefore, the RE 200 preferably embeds the ALD control signal in the CPRI frame, in addition to or instead of extracting the ALD control signal embedded in the CPRI frame. The operation of embedding the ALD control signal in the CPRI frame on the RE 200 is performed by the CPRI framer 202, which operates under the control of the CPU 203, in the same aspect as that of the operation of embedding the ALD control signal in the CPRI frame on the REC 100 described above. However, the specific hyperframe or the like may not be designated on the RE 200 side. On the RE 200 side, the ALD control signal may be embedded into the specific hyperframe designated by the specific information, notice of which is given from the REC 100.

Figure 10:
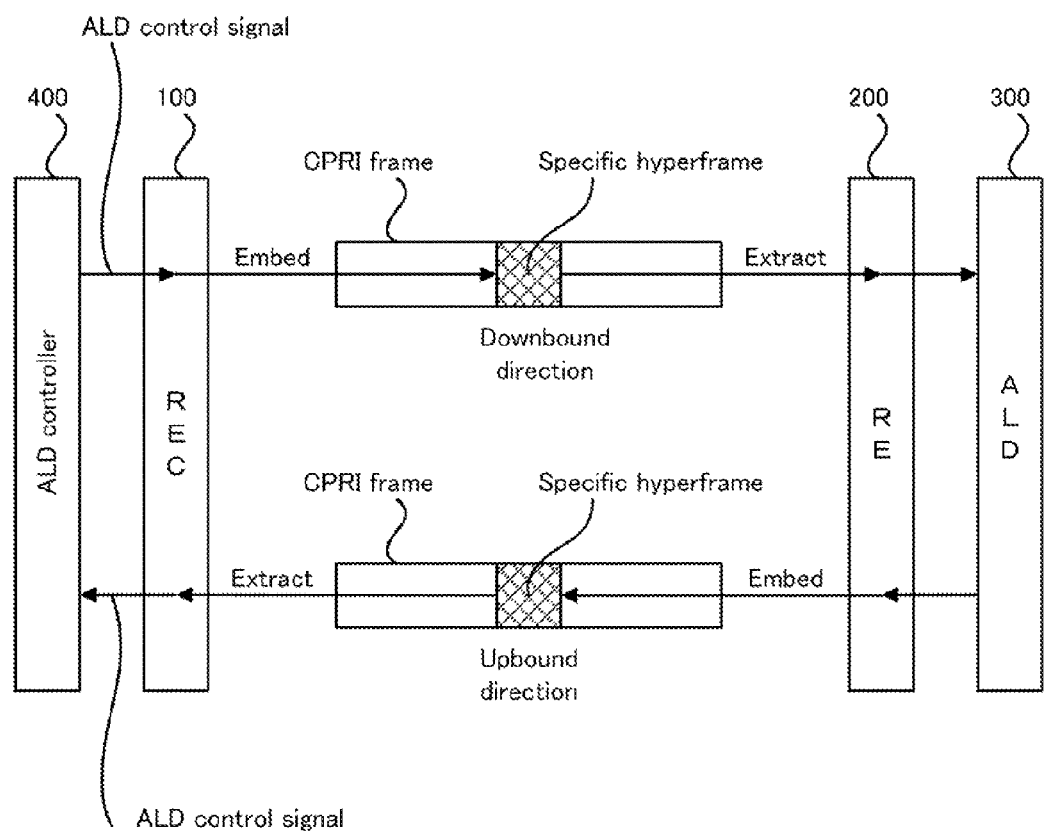
FIG. 10 is a schematic diagram briefly illustrating the operation of the wireless base station in the first embodiment.

The operations of the wireless base station 1 in the first embodiment explained above will be briefly explained with reference to FIG. 10. FIG. 10 is a schematic diagram briefly illustrating the operation of the wireless base station 1 in the first embodiment.

As illustrated in FIG. 10, in a downbound direction from the ALD controller 400 to the ALD 300, the REC 100 embeds the ALD control signal (in other words, the ALD control signal transmitted from the ALD controller 400) in the slow control and management data area of the specific hyperframe in the CPRI frame. The RE 200 extracts the ALD control signal embedded in the slow control and management data area of the specific hyperframe in the CPRI frame. The RE 200 transmits the extracted ALD control signal to the ALD 300. On the other hand, in an upbound direction from the ALD 300 to the ALD controller 400, the RE 200 embeds the ALD control signal (in other words, the ALD control signal which is to be transmitted to the ALD controller 400) in the slow control and management data area of the specific hyperframe in the CPRI frame. The REC 100 extracts the ALD control signal embedded in the slow control and management data area of the specific hyperframe in the CPRI frame. The REC 100 transmits the extracted ALD control signal to the ALD controller 400.

According to the wireless base station 1 in the first embodiment explained above, the ALD control signal for controlling the ALD 300 can be embedded in the CPRI frame. According to the wireless base station 1 in the first embodiment, the ALD control signal which complies with a HDLC protocol (High Level Data Link Control) protocol can be embedded in the slow control and management data area which complies with the HDLC protocol. Thus, the ALD control signal can be embedded in the CPRI frame without changing the structure of the CPRI frame. In other words, it is possible to embed the ALD control signal into the CPRI frame by mapping the ALD control signal by a bit unit. Therefore, the ALD control signal can be preferably embedded into the CPRI frame.

Moreover, according to the wireless base station 1 in the first embodiment, the ALD control signal can be transmitted by using the CPRI link 500 between the REC 100 and the RE 200. Thus, a dedicated line for transmitting the ALD control signal (e.g. a dedicated line between the ALD controller 400 and the ALD 300) may not be provided.

In addition, according to the wireless base station 1 in the first embodiment, the ALD control signal can be embedded into the specific hyperframe which appears regularly or periodically. In other words, according to the wireless base station 1 in the first embodiment, the ALD control signal may not be randomly embedded into the CPRI frame. Moreover, in the specific hyperframe, the ALD control signal can be embedded in the control word of the basic frame which appears regularly or periodically (i.e. the slow control and management data area). Thus, the RE 200 can extract the ALD control signal, relatively easily, by referring to the specific hyperframe and the basic frame with focusing on the regularity or periodicity. In other words, it is possible to relatively easily perform synchronization for the transmission and the reception of the ALD control signal between the REC 100 and the RE 200. Thus, there is no need to embed the ALD control signal in the CPRI frame after newly adding header information, footer information, or the like, including an address for specifying the destination ALD 300 or the like. There is no need to embed the ALD control signal in the CPRI frame after capsulating the ALD control signal. Therefore, in conformity with the standard of the CPRI, the ALD control signal can be properly embedded in the CPRI frame. By this, a special physical apparatus (e.g. a capsulating apparatus or the like) for embedding the ALD control signal in the CPRI frame may not be provided, and it is possible to ensure the general versatility of the wireless base station 1.

Moreover, according to the wireless base station 1 in the first embodiment, notice of the specific information for specifying the specific hyperframe in which the ALD control signal is embedded (moreover, the basic frame in which the ALD control signal is embedded) is given from the REC 100 to the RE 200. Therefore, the RE 200 can extract the ALD control signal from the specific hyperframe, relatively easily, with respect to notice information. In other words, it is possible to relatively easily perform the synchronization necessary for the transmission/reception of the ALD control signal between the REC 100 and the RE 200.

(2) Second Embodiment

With reference to FIG. 11 to FIG. 14, a wireless base station 2 in a second embodiment will be explained. Incidentally, the same constituents and operations as those of the wireless base station 1 in the first embodiment will carry the same reference numerals and step numbers, and the detailed explanation thereof will be omitted.

(2-1) System Configuration Diagram

Figure 11:
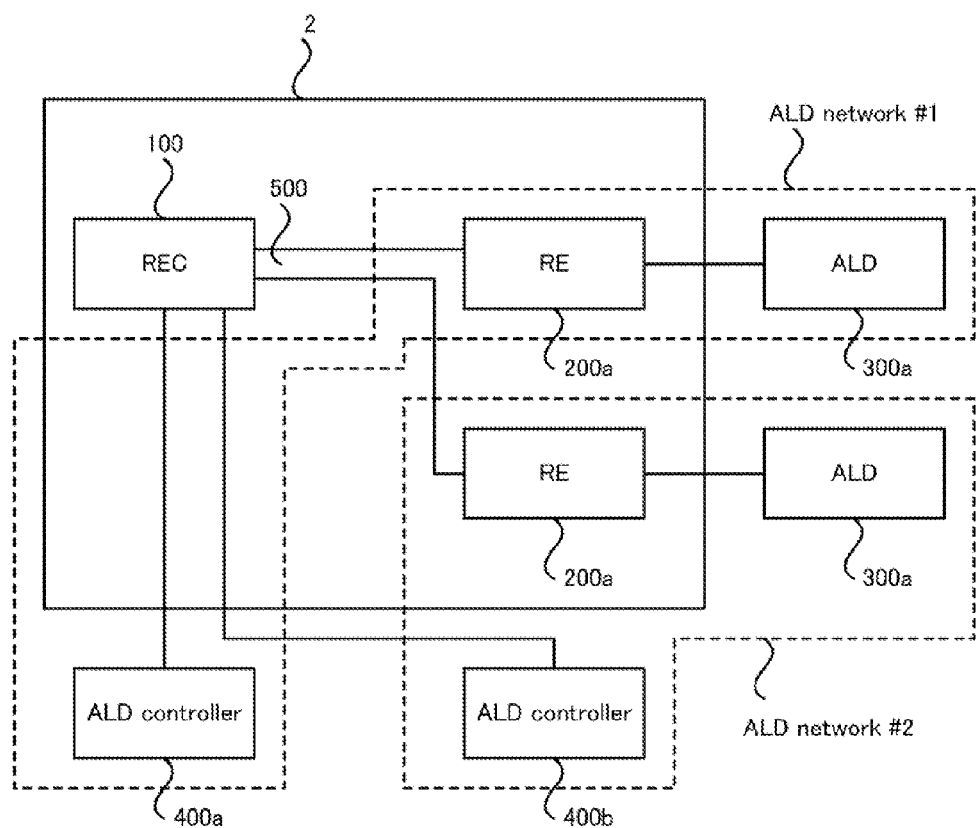
FIG. 11 is a block diagram illustrating one example of the structure of a wireless base station in a second embodiment.

With reference to FIG. 11, the basic structure of the wireless base station 2 in the second embodiment will be explained. FIG. 11 is a block diagram illustrating one example of the basic structure of the wireless base station 2 in the second embodiment.

As illustrated in FIG. 11, the wireless base station 2 in the second embodiment includes a REC 100, a RE 200a, a RE 200b, an ALD 300a connected to the RE 200a, an ALD 300b connected to the RE 200b, an ALD controller 400a for controlling the ALD 300a, and an ALD controller 400b for connecting the ALD 300b. The wireless base station 2 in the second embodiment has such a structure that two (i.e. a plurality of) REs 200 are connected to one REC 100 via a common public radio interface (CPRI) link 500 and that the ALD 300 is connected to each RE 200. In other words, in the wireless base station 2 in the second embodiment, a plurality of ALD networks are formed.

Incidentally, each of the structures of the REC 100 and the RE 200 is the same as explained in the first embodiment; however, the operation of each of the REC 100 and the RE 200 may be different from the operation explained in the first embodiment. Hereinafter, an explanation will be focused on the different operation.

(2-2) Explanation of Operation

The operation of the wireless base station 2 (i.e. the operations of the REC 100 and the RE 200) will be explained.

(2-2-1) Operation of REC

Figure 12:
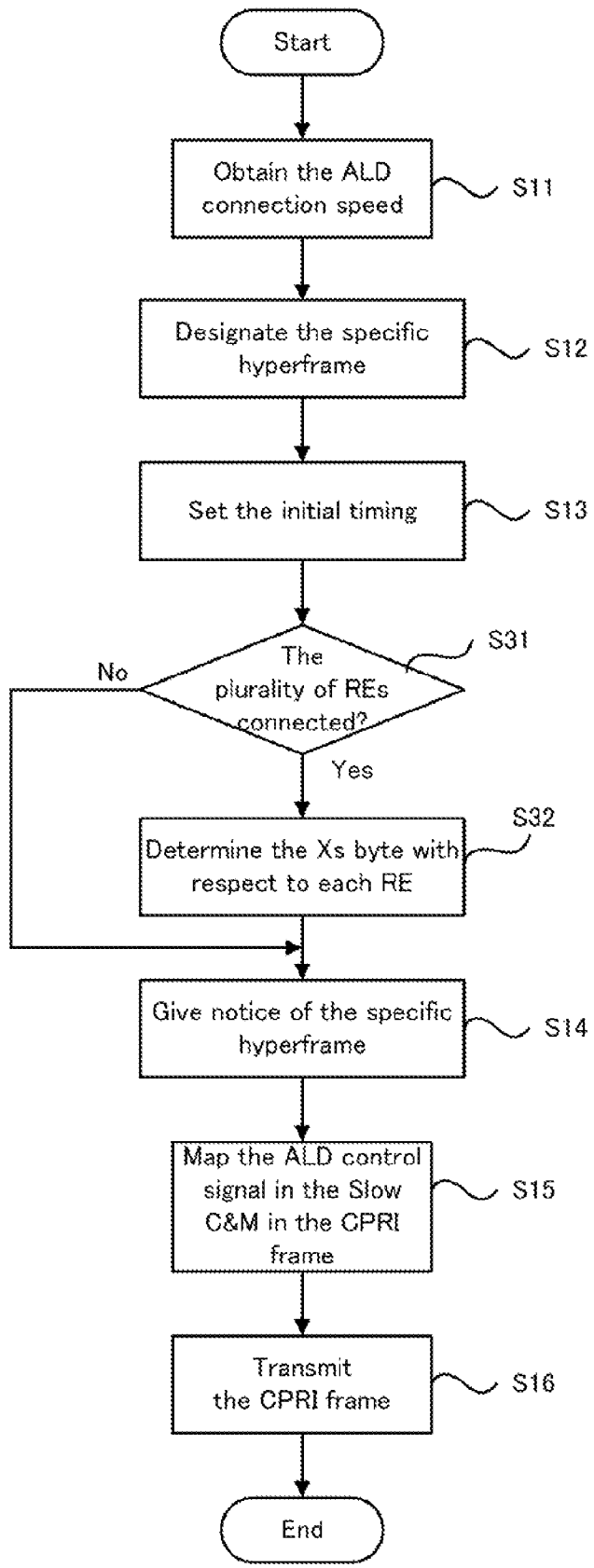
FIG. 12 is a flowchart illustrating a flow of operations of a REC included in the wireless base station in the second embodiment.

With reference to FIG. 12, the operation of the REC 100 included in the wireless base station 2 in the second embodiment will be explained. Here, the operation in which the REC 100 embeds the ALD control signal in the CPRI frame will be explained. FIG. 12 is a flowchart illustrating a flow of operations of the REC 100 included in the wireless base station 2 in the second embodiment.

As illustrated in FIG. 12, in the second embodiment, as in the operations in the first embodiment, the REC 100 obtains the ALD connection speed (the step S11), designates the specific hyperframe (the step S12), and sets the initial timing (the step S13). In the second embodiment, the CPU 103 included in the REC 100 judges whether or not the plurality of REs 200 are connected (step S31).

As a result of the judgment in the step S31, if it is judged that the plurality of REs 200 are not connected (the step S31: No), it is estimated that one RE 200 is connected to one REC 100. Therefore, as in the operations in the first embodiment, the REC 100 notifies of the specific information for specifying the specific hyperframe (the step S14), generates the CPRI frame while embedding the ALD control signal (the step S15), and transmits the CPRI frame to the RE 200 (the step S16).

On the other hand, as a result of the judgment in the step S31, if it is judged that the plurality of REs 200 are connected (the step S31: Yes), the CPU 103 included in the REC 100 assigns the corresponding control word number Xs to each of the plurality of REs 200 such that there are no overlaps between the assigned control word numbers (step S32). Specifically, the CPU 103 assigns one control word number (e.g. Xs=0) to the RE 200a and assigns another control word number (e.g. Xs=1) different from the one control word number to the RE 200b.

Then, the CPU 103 included in the REC 100 notifies the RE 200 of the specific information for specifying the specific hyperframe, via the CPRI framer 102 and the CPRI link 500 (the step S14). At this time, the specific information in the second embodiment preferably includes information for specifying the control word number Xs assigned in the step S32.

Then, the CPRI framer 102 included in the REC 100 generates the CPRI frame while embedding the ALD control signal transmitted from the ALD controller 400, under the control of the CPU 103 (the step S15). In the second embodiment, the CPRI framer 102 embeds the ALD control signal, which is transmitted from the ALD controller 400a and which is transmitted to the ALD 300a, in the control word (or slow control and management data area) corresponding to the control word number Xs (e.g. 0) assigned to the RE 200a in the step S32. Specifically, for example, the CPRI framer 102 embeds the ALD control signal transmitted from the ALD controller 400a, in the control word of the basic frame with X=1 in the specific hyperframe. On the other hand, the CPRI framer 102 embeds the ALD control signal, which is transmitted from the ALD controller 400b and which is transmitted to the ALD 300b, in the control word (or slow control and management data area) corresponding to the control word number Xs (e.g. 1) assigned to the RE 200b in the step S32. Specifically, for example, the CPRI framer 102 embeds the ALD control signal transmitted from the ALD controller 400b, in the control word of the basic frame with X=65 in the specific hyperframe.

Then, the CPRI framer 102 included in the REC 100 transmits the CPRI frame to the RE 200 via the CPRI link 500 (the step S16).

(2-2-2) Operation of RE

Figure 13:
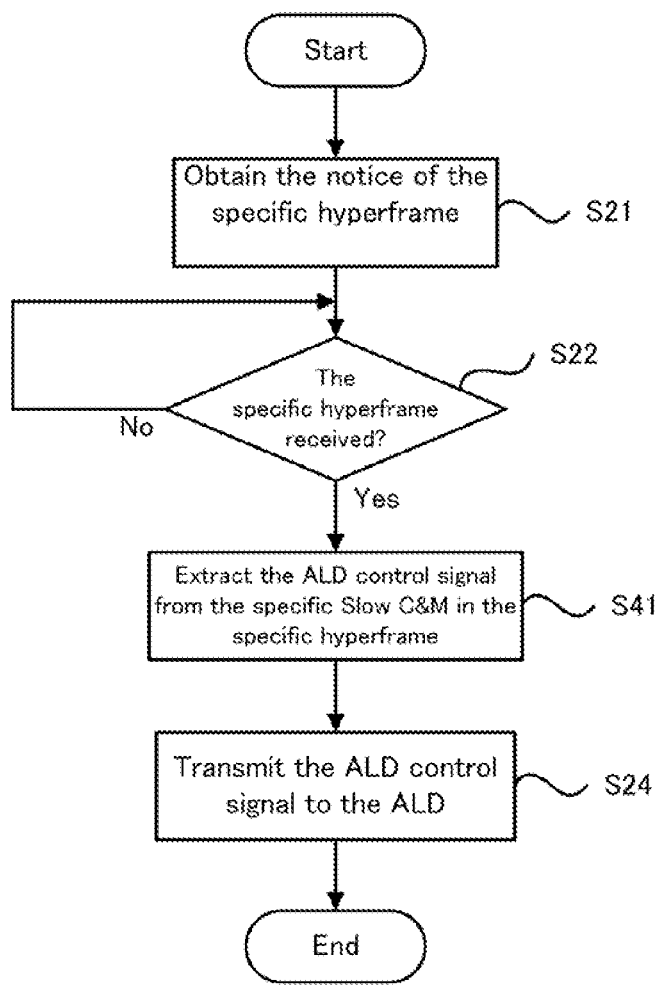
FIG. 13 is a flowchart illustrating a flow of operations of a RE included in the wireless base station in the second embodiment.

With reference to FIG. 13, the operation of the RE 200 included in the wireless base station 2 in the second embodiment will be explained. FIG. 13 is a flowchart illustrating a flow of operations of the RE 200 included in the wireless base station 2 in the second embodiment.

As illustrated in FIG. 13, as in the operations in the first embodiment, the CPU 203 included in the RE 200 obtains the specific information (the step S21) and judges whether or not the specific hyperframe is received (the step S22).

As a result of the judgment in the step S22, if it is judged that the specific hyperframe is not received (the step S22: No), the judgment operation in the step S22 is continued.

On the other hand, as a result of the judgment in the step S22, if it is judged that the specific hyperframe is received (the step S22: Yes), the CPRI framer 202 included in the RE 200 extracts the ALD control signal from the slow control and management data area in the specific hyperframe (step S41). In the second embodiment, the CPRI framer 202 included in the RE 200 extracts the ALD control signal from the control word (or slow control and management data area) corresponding to the control word number assigned to each RE 200. For example, an explanation will be given on an example in which the control word number Xs=0 is assigned to the RE 200a and the control word number Xs=1 is assigned to the RE 200b. The CPRI framer 202 included in the RE 200a extracts the ALD control signal from the control word (or slow control and management data area) of the basic frame with X=1 in the specific hyperframe. On the other hand, the CPRI framer 202 included in the RE 200b extracts the ALD control signal from the control word (or slow control and management data area) of the basic frame with X=65 in the specific hyperframe.

Then, the CPRI framer 202 included in the RE 200 transmits the ALD control signal extracted in the step S41, to the ALD 300 (the step S24). More specifically, the RE 200a transmits the ALD control signal extracted in the step S41, to the ALD 300a. On the other hand, the RE 200b transmits the ALD control signal extracted in the step S41, to the ALD 300b. As a result, the ALDs 300a and 300b operate under the control by the ALD control signal.

Figure 14:
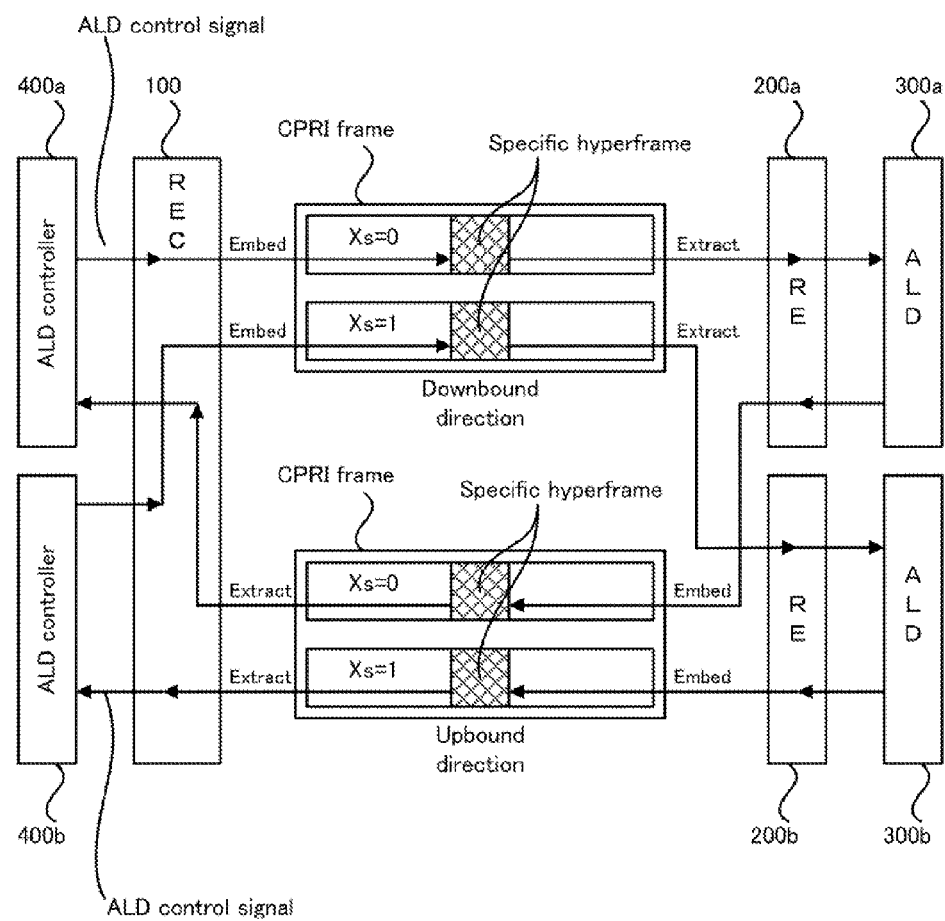
FIG. 14 is a schematic diagram briefly illustrating the operation of the wireless base station in the second embodiment.

The operation of the wireless base station 2 in the second embodiment explained above will be briefly explained with reference to FIG. 14. FIG. 14 is a schematic diagram briefly illustrating the operation of the wireless base station 2 in the second embodiment.

As illustrated in FIG. 14, in a downbound direction from the ALD controllers 400a and 400b to the ALDs 300a and 300b, the REC 100 embeds the ALD control signal for controlling the ALD 300a (in other words, the ALD control signal transmitted from the ALD controller 400a) in the slow control and management data area with a control word number of "0" in the specific hyperframe. Moreover, the REC 100 embeds the ALD control signal for controlling the ALD 300b (in other words, the ALD control signal transmitted from the ALD controller 400b) in the slow control and management data area with a control word number of "1" in the specific hyperframe. Moreover, the RE 200a extracts the ALD control signal from the slow control and management data area with a control word number of "0" in the specific hyperframe and transmits the extracted ALD control signal to the ALD 300a. Moreover, the RE 200b extracts the ALD control signal from the slow control and management data area with a control word number of "1" in the specific hyperframe and transmits the extracted ALD control signal to the ALD 300b.

On the other hand, in an upbound direction from the ALDs 300a and 300b to the ALD controllers 400a and 400b, the RE 200a embeds the ALD control signal for controlling the ALD 300a (in other words, the ALD control signal transmitted to the ALD controller 400a) in the slow control and management data area with a control word number of "0" in the specific hyperframe. Moreover, the RE 200b embeds the ALD control signal for controlling the ALD 300b (in other words, the ALD control signal transmitted to the ALD controller 400b) in the slow control and management data area with a control word number of "1" in the specific hyperframe. Moreover, the REC 100 extracts the ALD control signal from the slow control and management data area with a control word number of "0" in the specific hyperframe and transmits the extracted ALD control signal to the ALD controller 400a. Moreover, the REC 100 extracts the ALD control signal from the slow control and management data area with a control word number of "1" in the specific hyperframe and transmits the extracted ALD control signal to the ALD controller 400b.

As explained above, according to the wireless base station 2 in the second embodiment, it is possible to receive the same effects as those received by the wireless base station 1 in the first embodiment.

According to the wireless base station 2 in the second embodiment, the control word number Xs is used as a substantive address (i.e. an address in the communication between the ALD 300 and the ALD controller 400). Therefore, even if the plurality of REs 200a and 200b are connected to the REC 100 which is connected to the plurality of ALD controllers 400a and 400b, it is possible to appropriately transmit the ALD control signals from the plurality of ALD controllers 400a and 400b to the corresponding ALDs 300a and 300b via the corresponding REs 200a and 200b. In the same manner, it is possible to appropriately transmit the ALD control signals from the plurality of ALDs 300a and 300b to the corresponding ALD controllers 400a and 400b via the corresponding REs 200a and 200b.

Incidentally, the aforementioned explanation states the example in which two REs 200a and 200b are connected to one REC 100. However, even if three or more REs are connected to one REC 100 and the ALD 300 is connected to each RE 200, obviously, it is possible to receive the same effects by performing the same operation.

(3) Third Embodiment

Figure 15:
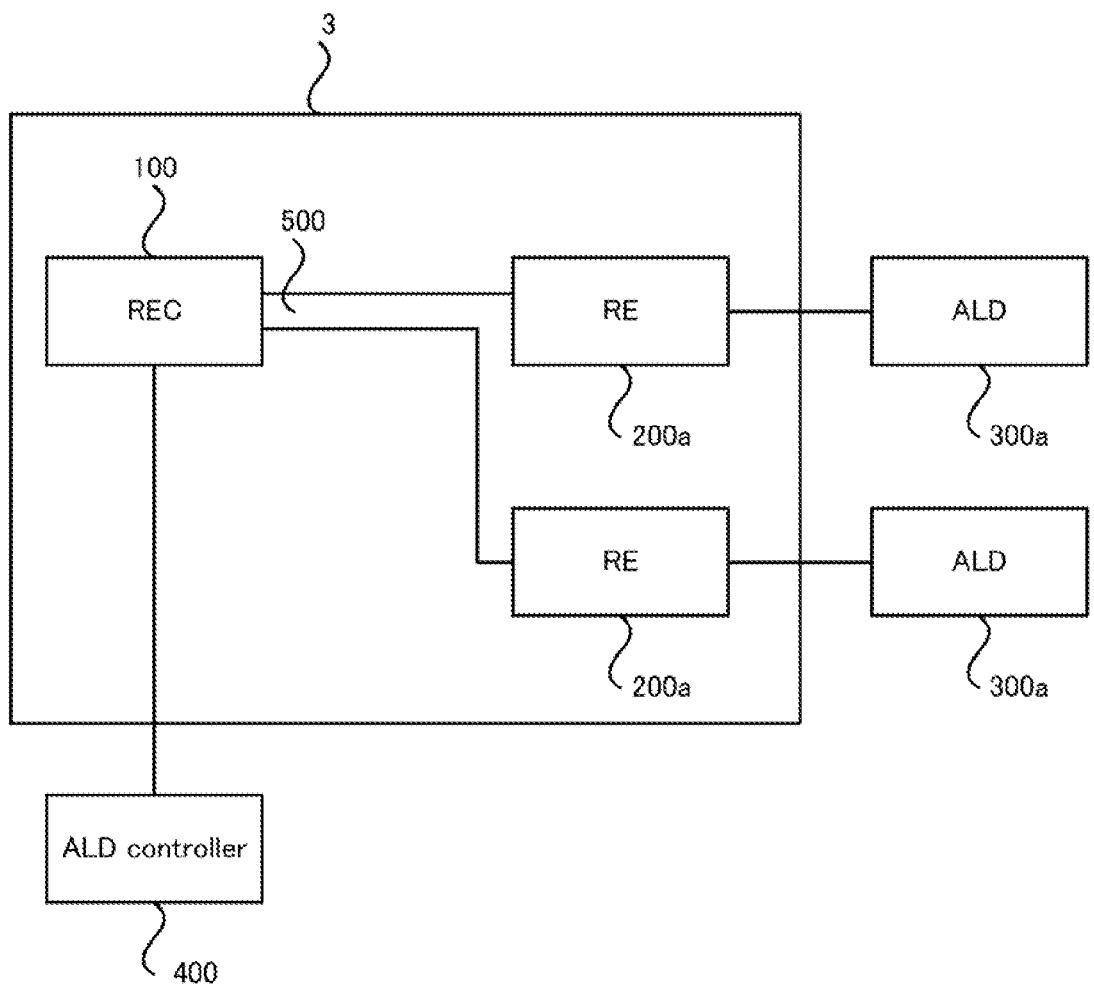
FIG. 15 is a block diagram illustrating one example of the structure of a wireless base station in a third embodiment.
Figure 16:
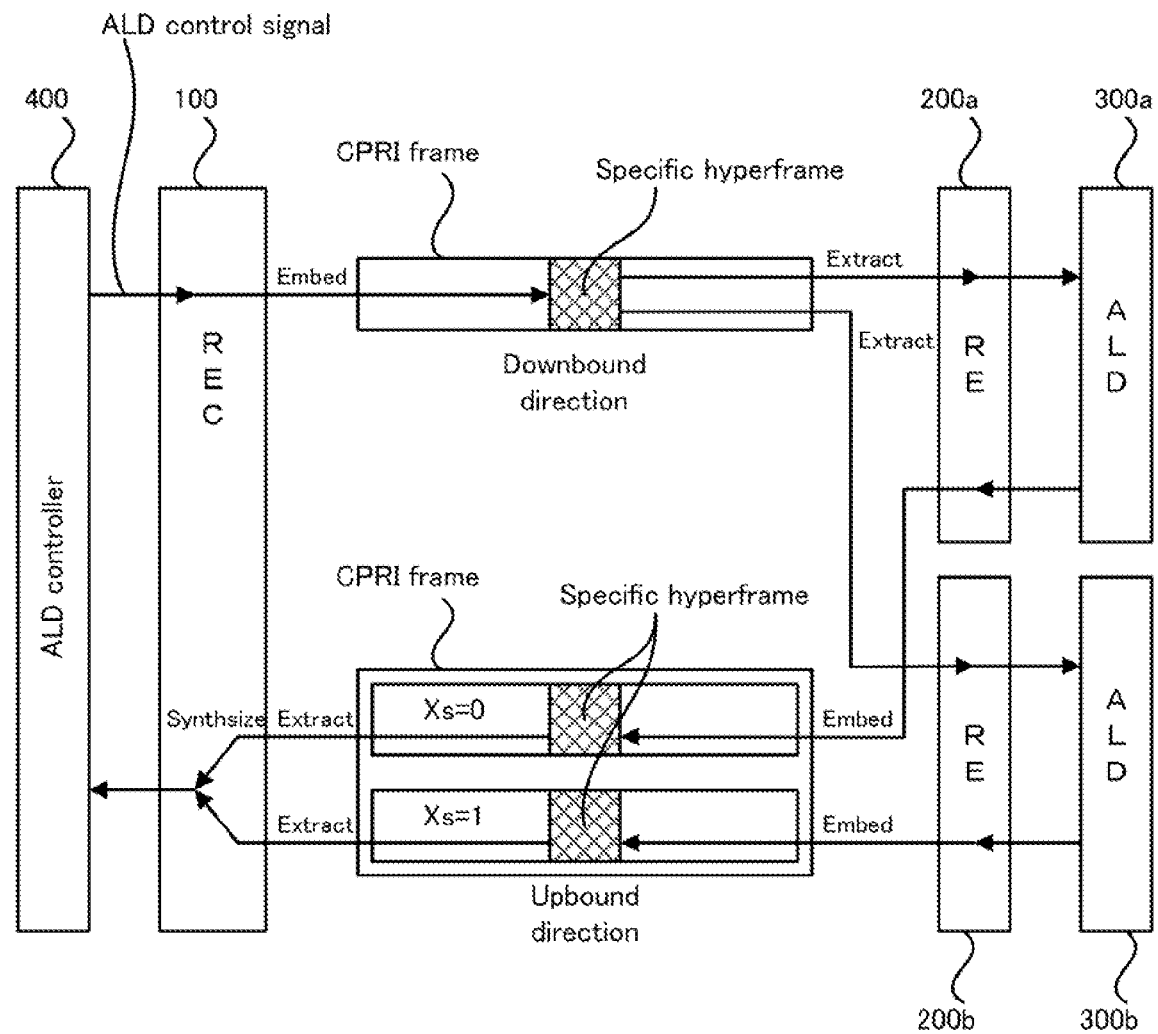
FIG. 16 is a schematic diagram illustrating the operation of the wireless base station in the third embodiment.

With reference to FIG. 15 and FIG. 16, a wireless base station 3 in a third embodiment will be explained. Incidentally, the same constituents and operations as those of the wireless base station 1 in the first embodiment and the wireless base station 2 in the second embodiment will carry the same reference numerals and step numbers, and the detailed explanation thereof will be omitted. FIG. 15 is a block diagram illustrating one example of the basic structure of the wireless base station 3 in the third embodiment. FIG. 16 is a schematic diagram illustrating the operation of the wireless base station 3 in the third embodiment.

As illustrated in FIG. 15, the wireless base station 3 in the third embodiment includes a REC 100, a RE 200a, a RE 200b, an ALD 300a connected to the RE 200a, an ALD 300b connected to the RE 200b, and an ALD controller 400 for controlling the ALD 300a and the ALD 300b. In other words, in the wireless base station 3 in the third embodiment, a single ALD network is formed while the plurality of REs 200 and the plurality of ALDs 300 are provided.

Incidentally, the structure of each of the REC 100 and the RE 200 is the same as the structure explained in the first embodiment; however, the operation of each of the REC 100 and the RE 200 may be different from the operation explained in the first embodiment. Hereinafter, an explanation will be focused on the different operation.

Firstly, in a downbound direction from the ALD controller 400 to the ALDs 300a and 300b, the operations in the same aspects as in the first embodiment are performed. Specifically, as illustrated in FIG. 16, the REC 100 embeds the ALD control signal for controlling the ALDs 300a and 300b (in other words, the ALD control signal transmitted from the ALD controller 400) in the slow control and management data area of the specific hyperframe in the CPRI frame. Moreover, the RE 200a extracts the ALD control signal embedded in the slow control and management data area of the specific hyperframe in the CPRI frame and transmits the extracted ALD control signal to the ALD 300a. In the same manner, the RE 200b extracts the ALD control signal embedded in the slow control and management data area of the specific hyperframe in the CPRI frame and transmits the extracted ALD control signal to the ALD 300b. In other words, in the downbound direction, the same ALD control signal is transmitted from the REC 100 to each of the RE 200a and the RE 200b. Each of the ALD 300a and the ALD 300b performs the operation based on the ALD control signal, by extracting messages to each of the ALD 300a and the ALD 300b from the ALD control signal.

On the other hand, in an upbound direction from the ALD 300a and the ALD 300b to the ALD controller 400, the same operations as in the second embodiment are performed. Specifically, as illustrated in FIG. 16, the RE 200a embeds the ALD control signal for controlling the ALD 300a (in other words, the ALD control signal transmitted from the ALD 300a to the ALD controller 400) in the slow control and management data area with a control word number of "0" in the specific hyperframe. Moreover, the RE 200b embeds the ALD control signal for controlling the ALD 300b (in other words, the ALD control signal transmitted from the ALD 300b to the ALD controller 400) in the slow control and management data area with a control word number of "1" in the specific hyperframe. Moreover, the REC 100 extracts the ALD control signal from the slow control and management data area with a control word number of "0" in the specific hyperframe and extracts the ALD control signal from the slow control and management data area with a control word number of "1" in the specific hyperframe. The REC 100 also transmits a synthesized signal obtained by bit-adding the extracted two types of ALD control signals, to the ALD controller 400.

As explained above, according to the wireless base station 3 in the third embodiment, it is possible to receive the same effects as those received by the wireless base station 1 in the first embodiment and the wireless base station 2 in the second embodiment.

According to the wireless base station 3 in the third embodiment, even if the plurality of REs 200a and 200b and the plurality of ALDs 300a and 300b are disposed in one ALD network, it is possible to appropriately transmit the ALD control signals from the ALD controller 400 to each of the ALDs 300a and 300b, via the corresponding REs 200a and 200b. In the same manner, it is possible to appropriately transmit the ALD control signals from the ALDs 300a and 300b to the corresponding ALD controller 400, via the corresponding REs 200a and 200b. In other words, it is possible to relatively easily perform synchronization for the transmission and the reception of the ALD control signal between the REC 100 and the REs 200a and 200b.

Incidentally, the aforementioned explanation states the example in which two REs 200a and 200b are connected to one REC 100. However, even if three or more REs are connected to one REC 100 and the ALD 300 is connected to each RE 200, obviously, it is possible to receive the same effects by performing the same operations.

With regard to the first to third embodiments explained above, the following additional statements are further disclosed.

(Additional Statement 1)

A wireless base station including:

a wireless apparatus; and a wireless controlling apparatus for controlling the wireless apparatus, the wireless apparatus and the wireless controlling apparatus being connected via a transmission link, the wireless controlling apparatus including:

an embedding processor for embedding a control signal, which is to control a wireless device connected to the wireless apparatus, in a control and management information area in a specific frame, the specific frame being regularly assigned to each frame group including a predetermined number of frames of a plurality of frames included in a transmission frame transmitted via the transmission link; and a first transmitter for transmitting the transmission frame to the wireless apparatus via the transmission link, the wireless apparatus including:

an extractor for extracting the control signal from the specific frame in the transmitted transmission frame; and a second transmitter for transmitting the extracted control signal to the wireless device.

(Additional Statement 2)

The wireless base station according to the additional statement 1, wherein the wireless controlling apparatus further includes:

a designating processor for designating the specific frame; and a notifying processor for notifying the wireless apparatus of specific information for specifying the designated specific frame, and the extractor extracts the control signal from the specific frame in the transmitted transmission frame on the basis of the specific information.

(Additional Statement 3)

The wireless base station according to the additional statement 1 or 2, wherein the wireless controlling apparatus is connected to each of at least a first wireless apparatus and a second wireless apparatus, and the embedding processor embeds a first control signal, which is to control the wireless device connected to the first wireless apparatus, in a first area portion of the control and management information area in the specific frame and embeds a second control signal, which is to control the wireless device connected to the second wireless apparatus, in a second area portion different from the first area portion of the control and management information area in the specific frame.

(Additional Statement 4)

The wireless base station according to any one of the additional statements 1 to 3, wherein the transmission link adopts a common public radio interface (CPRI) which is specification of an internal interface of the wireless base station, and the transmission frame is defined by the CPRI.

(Additional Statement 5)

The wireless base station according to the additional statement 4, wherein the control and management information area is a Slow C&M.

(Additional Statement 6)

The wireless base station according to any one of the additional statements 1 to 5, wherein the wireless apparatus further includes:

an embedding processor for embedding the control signal in the control and management information area in the specific frame; and a third transmitter for transmitting the transmission frame to the wireless controlling apparatus via the transmission link.

(Additional Statement 7)

The wireless base station according to the additional statement 6, wherein the wireless controlling apparatus further includes:

an extractor for extracting the control signal from the specific frame in the transmission frame transmitted from the wireless apparatus; and a fourth transmitter for transmitting the extracted control signal to a wireless device controlling apparatus for controlling the wireless device.

(Additional Statement 8)

A wireless controlling apparatus connected to a wireless apparatus via a transmission link, the wireless controlling apparatus including:

an embedding processor for embedding a control signal, which is to control a wireless device connected to the wireless apparatus, in a control and management information area in a specific frame, the specific frame being regularly assigned to each frame group including a predetermined number of frames of a plurality of frames included in a transmission frame transmitted via the transmission link; and a transmitter for transmitting the transmission frame to the wireless apparatus via the transmission link.

(Additional Statement 9)

A wireless apparatus connected to a wireless controlling apparatus via a transmission link, the wireless controlling apparatus embedding a control signal, which is to control a wireless device connected to the wireless apparatus, in a control and management information area in a specific frame, the specific frame being regularly assigned to each frame group including a predetermined number of frames of a plurality of frames included in a transmission frame transmitted via the transmission link, the wireless controlling apparatus transmitting the transmission frame via the transmission link, the wireless apparatus including:

an extractor for extracting the control signal from the specific frame in the transmitted transmission frame; and a transmitter for transmitting the extracted control signal to the wireless device.

(Additional Statement 10)

A communication method in a wireless base station in which a wireless apparatus and a wireless controlling apparatus for controlling the wireless apparatus are connected via a transmission link, the communication method including:

an embedding process of embedding a control signal, which is to control a wireless device connected to the wireless apparatus, in a control and management information area in a specific frame, the specific frame being regularly assigned to each frame group including a predetermined number of frames of a plurality of frames included in a transmission frame transmitted via the transmission link, on the wireless controlling apparatus side;

a first transmitting process of transmitting the transmission frame to the wireless apparatus via the transmission link, on the wireless controlling apparatus side;

an extractor of extracting the control signal from the specific frame in the transmitted transmission frame, on the wireless apparatus side; and a second transmitting process of transmitting the extracted control signal to the wireless device, on the wireless apparatus side.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless base station comprising:

a RE (Radio Equipment); and a REC (Radio Equipment Control) that controls the RE, the RE and the REC being connected via a transmission link, the REC comprising:

an embedding processor that embeds a control signal, which is to control a ALD (Antenna Line Device) connected to the RE, in a control and management information area in a specific frame, the specific frame being regularly assigned to each frame group including a predetermined number of frames of a plurality of frames included in a transmission frame transmitted via the transmission link; and a first transmitter that transmits the transmission frame to the RE via the transmission link, the RE comprising:

an extractor that extracts the control signal from the specific frame in the transmitted transmission frame; and a second transmitter that transmits the extracted control signal to the ALD, the REC is connected to each of at least a first RE and a second RE, and the embedding processor embeds a first control signal, which is to control the ALD connected to the first RE, in a first area portion of the control and management information area in the specific frame and embeds a second control signal, which is to control the ALD connected to the second RE, in a second area portion different from the first area portion of the control and management information area in the specific frame.

2. The wireless base station according to claim 1, wherein the REC further comprises:

a designating processor that designates the specific frame; and a notifying processor that notifies the RE of specific information for specifying the designated specific frame, and the extractor extracts the control signal from the specific frame in the transmitted transmission frame on the basis of the specific information.

3. The wireless base station according to claim 1, wherein the transmission link adopts a common public radio interface (CPRI) which is specification of an internal interface of the wireless base station, and the transmission frame is defined by the CPRI.

4. The wireless base station according to claim 3, wherein the control and management information area is a Slow C&M (Control and Management data).

5. A REC (Radio Equipment Control) connected to a RE (Radio Equipment) via a transmission link, the REC comprising:

an embedding processor that embeds a control signal, which is to control a ALD (Antenna Line Device) connected to the RE, in a control and management information area in a specific frame, the specific frame being regularly assigned to each frame group including a predetermined number of frames of a plurality of frames included in a transmission frame transmitted via the transmission link; and a transmitter that transmits the transmission frame to the RE via the transmission link, the REC is connected to each of at least a first RE and a second RE, and the embedding processor embeds a first control signal, which is to control the ALD connected to the first RE, in a first area portion of the control and management information area in the specific frame and embeds a second control signal, which is to control the ALD connected to the second RE, in a second area portion different from the first area portion of the control and management information area in the specific frame.

6. A RE (Radio Equipment) connected to a REC (Radio Equipment Control) via a transmission link,
the REC embedding a control signal, which is to control a ALD (Antenna Line Device) connected to the RE, in a control and management information area in a specific frame, the specific frame being regularly assigned to each frame group including a predetermined number of frames of a plurality of frames included in a transmission frame transmitted via the transmission link,
the REC transmitting the transmission frame via the transmission link,
the RE comprising:
an extractor that extracts the control signal from the specific frame in the transmitted transmission frame; and
a transmitter that transmits the extracted control signal to the ALD,
the REC is connected to each of at least a first RE and a second RE, and
the REC embeds a first control signal, which is to control the ALD connected to the first RE, in a first area portion of the control and management information area in the specific frame and embeds a second control signal, which is to control the ALD connected to the second RE, in a second area portion different from the first area portion of the control and management information area in the specific frame.

7. A communication method in a wireless base station in which a RE (Radio Equipment) and a REC (Radio Equipment Control) that controls the RE are connected via a transmission link,
the communication method comprising:
an embedding process of embedding a control signal, which is to control a ALD (Antenna Line Device) connected to the RE, in a control and management information area in a specific frame, the specific frame being regularly assigned to each frame group including a predetermined number of frames of a plurality of frames included in a transmission frame transmitted via the transmission link, on the REC side;
a first transmitting process of transmitting the transmission frame to the RE via the transmission link, on the REC side;
an extracting process of extracting the control signal from the specific frame in the transmitted transmission frame, on the RE side; and
a second transmitting process of transmitting the extracted control signal to the ALD, on the RE side,
the REC is connected to each of at least a first RE and a second RE, and
the embedding process embeds a first control signal, which is to control the ALD connected to the first RE, in a first area portion of the control and management information area in the specific frame and embeds a second control signal, which is to control the ALD connected to the second RE, in a second area portion different from the first area portion of the control and management information area in the specific frame.

* * * * *